United States Patent
Sasaki et al.

(10) Patent No.: US 8,310,614 B2
(45) Date of Patent: Nov. 13, 2012

(54) LIQUID CRYSTAL DISPLAY DEVICE HAVING A CURVED SHAPE COMPRISING POSITIVE AND NEGATIVE CURVATURES

(75) Inventors: Susumu Sasaki, Chiba (JP); Hitoshi Azuma, Yokohama (JP); Takao Ebine, Ootaki (JP); Tomio Yaguchi, Sagamihara (JP); Shoichi Uchino, Annaka (JP); Akiko Iwata, Chiba (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 227 days.

(21) Appl. No.: 12/222,340

(22) Filed: Aug. 7, 2008

(65) Prior Publication Data

US 2009/0201443 A1 Aug. 13, 2009

(30) Foreign Application Priority Data

Aug. 9, 2007 (JP) ................................. 2007-208345

(51) Int. Cl.
*G02F 1/1333* (2006.01)
(52) U.S. Cl. .......................................... 349/56; 349/158
(58) Field of Classification Search .................... 349/56, 349/60, 150, 158
See application file for complete search history.

(56) References Cited

U.S. PATENT DOCUMENTS

| | | | |
|---|---|---|---|
| 7,190,503 B2 | 3/2007 | Ide | |
| 2002/0027636 A1* | 3/2002 | Yamada | 349/155 |
| 2007/0146569 A1* | 6/2007 | Nouchi et al. | 349/58 |

FOREIGN PATENT DOCUMENTS

| | | |
|---|---|---|
| JP | 1-287529 A | 11/1989 |
| JP | 2-51320 U | 4/1990 |
| JP | 2001-337623 A | 12/2001 |
| JP | 2003-280548 | 3/2002 |
| JP | 2005-115087 A | 4/2005 |
| JP | 2005-134461 A | 5/2005 |
| JP | 2006-106603 A | 4/2006 |

OTHER PUBLICATIONS

Office Action issued from Japanese Patent Office in corresponding Japanese Patent Application No. 2007-208345 dated Apr. 10, 2012, pp. 1-3.

* cited by examiner

*Primary Examiner* — Mark Robinson
*Assistant Examiner* — Paul Lee
(74) *Attorney, Agent, or Firm* — Stites & Harbison, PLLC; Juan Carlos A. Marquez, Esq.

(57) ABSTRACT

A liquid crystal display device preventing a liquid crystal display panel from damage by bending of a light-transmissive substrate and capable of curving a display surface of the panel is provided. The liquid crystal display device comprising: a liquid crystal display panel having a liquid crystal layer sealed between a pair of light-transmissive substrates having pixel formation electrodes on inner surfaces thereof, and formed by assembling positive and negative curved surfaces with respect to one direction; a backlight mounted on a rear surface of the panel along a curved shape of the panel and having at least one light emission device irradiating illumination light toward the rear surface; and a resin member held in a space between peripheral portions where the panel is opposed to the backlight, and fixing and holding a curved state, is provided. Distortion of the light transmissive glass substrates by bending of the panel is eased.

8 Claims, 8 Drawing Sheets

LIQUID CRYSTAL DISPLAY DEVICE HAVING A CURVED SHAPE COMPRISING POSITIVE AND NEGATIVE CURVATURES

CROSS-REFERENCE TO RELATED APPLICATION

The present application claims priority from Japanese application JP 2007-208345 filed on Aug. 9, 2007, the content of which is hereby incorporated by reference into this application.

BACKGROUND OF THE INVENTION

1. Field of the Invention

The present invention relates to a liquid crystal display device for use in a television, a personal computer and the like, for example, in particular, to a liquid crystal display device having a curved liquid crystal display panel, and in detail, to curved structure of a liquid crystal display panel.

2. Description of the Related Art

A liquid crystal display panel forming a liquid crystal display device is basically an image display device having structure in which a liquid crystal layer is sealed between first and second substrates preferably made of glass substrates and utilizing nature that orientation of liquid crystal changes according to an electric field applied to the liquid crystal from a pixel selection electrode provided to the substrate. A full-transmissive liquid crystal display device widely used in these days has structure in which source light from a backlight mounted in a rear surface side of the liquid crystal display panel is polarized by about 90 degrees in a liquid crystal layer and passed through a polarizer so that a latent electron image can be seen as a visible image.

In a liquid crystal display device employing a liquid crystal display panel of a non-light emissive type, a latent electron image formed on the liquid crystal display panel is made visible by an external illumination means provided. As the external illumination means, an illumination device is mounted on a rear surface or a front surface of the liquid crystal display panel, except for a case of structure utilizing natural light. In particular, for a display device requiring high brightness, structure in which the illumination device is mounted on the rear surface of the liquid crystal display panel (a suspend light type backlight) is a mainstream.

SUMMARY OF THE INVENTION

A liquid crystal display using a liquid crystal display device is widely used as a display terminal of a note type personal computer, a television, a mobile information device such as a portable phone, a personal digital assistant and the like. The majority of currently used liquid crystal displays are formed on a glass substrate. Meanwhile, for a liquid crystal display panel including a liquid crystal display, light-weight, thin and flexible structure is required.

Therefore, in order to satisfy this requirement, material such as plastic, which is hardly breakable even if it is formed in a thin-film shape and is light-weight, is used for the liquid crystal display as a substrate, instead of a glass substrate.

However, most plastic has heat-proof temperature equal to or lower than about 200° C. and it is not tolerant to a process at about 350° C. to 600° C. required for manufacturing of a thin film transistor using amorphous silicon and polysilicon. Therefore, formation of an active matrix type substrate including a thin film transistor having high-performance and high-precision on a plastic substrate is extremely difficult.

In order to solve the above described problem, cell structure using a substrate obtained by adhering a plastic substrate to a thin film glass substrate is proposed. However, if a heat pressing process is carried out to the cell structure, problems such that the glass substrate or the plastic substrate is damaged or they are separated from each other may occur, because of a heat stress caused by difference of thermal expansion coefficients between the glass and plastic substrates and deterioration of mechanical strength caused by thinning the glass substrate.

Furthermore, in order to solve the above described problem, structure preventing damage of the glass plate caused by a mechanical stress from occurring, by thinning a glass board by etching so as to be a thin-meat shape, and in a process of forming the thin-meat-shaped glass board in a curved shape, leaving only a portion near one edge of the glass plate thick is disclosed in Japanese Patent Laid-Open Publication No. 2003-280548 (Patent Document 1).

However, the liquid crystal display panel formed in the manner described above may possibly be damaged due to a mechanical stress caused by bending the glass substrate. There are problems such that it is extremely difficult to avoid the damage certainly and the like.

The present inventors and the like tried to bend (curving into a convex or concave shape) the liquid crystal display panel by melting a light-transmissive glass plate forming the liquid crystal display panel by fluoric acid to make the same thinner. As a result, it is found that the liquid crystal display panel can be curved with a radius of about 100 mm or smaller if a thickness (a substantial total glass plate thickness) of the liquid crystal display panel is made to be equal to or smaller than about 200 µm, for example.

However, it is found that, in comparison with a glass substrate alone supposed to have identical mechanical property, a liquid crystal display is not readily bendable (that is, breakable by bending) even if the total glass thickness of the liquid crystal display is identical to that of the glass substrate. This is because stresses in different directions, that is, a compressive stress and a tensile stress, are caused between these glass substrates since the liquid crystal display panel is made of two glass substrates adhered to each other with only peripheral portions thereof fixed. Therefore, it is considered that stress difference caused by the stresses concentrates in a vicinity of a fixed seal, and causes the damage.

Figure 7A:
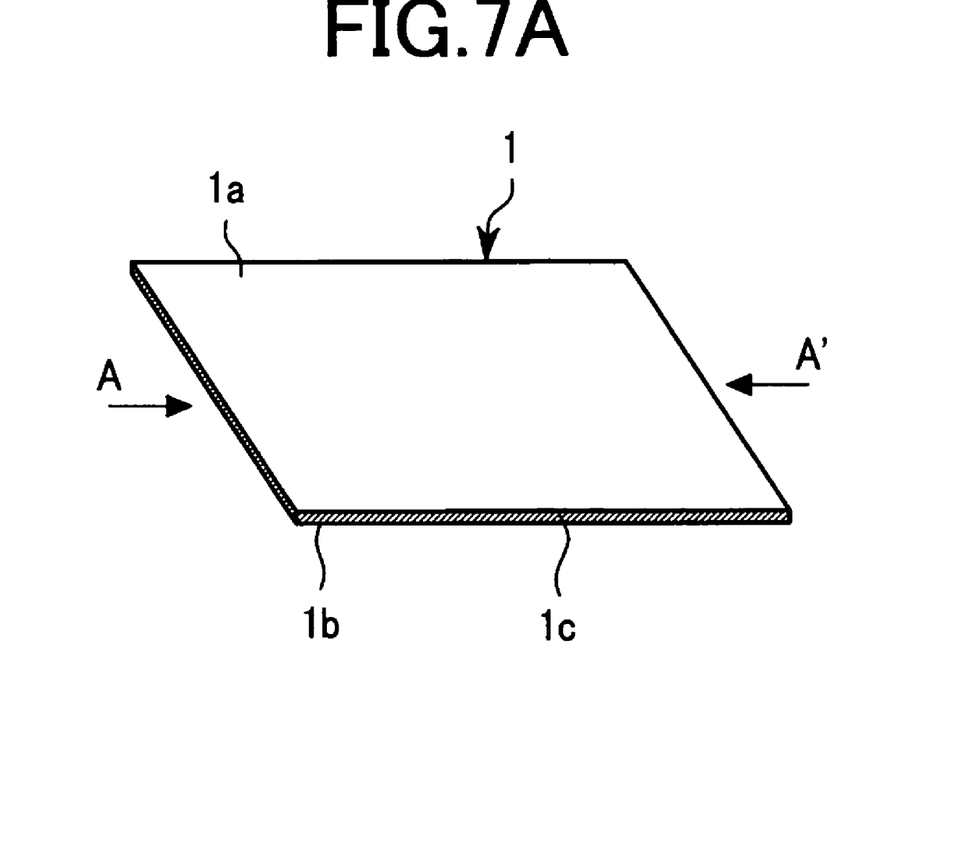
FIG. 7A is a perspective view of a liquid crystal panel to explain one example of a bending step in manufacturing of the liquid crystal display panel.
Figure 7B:
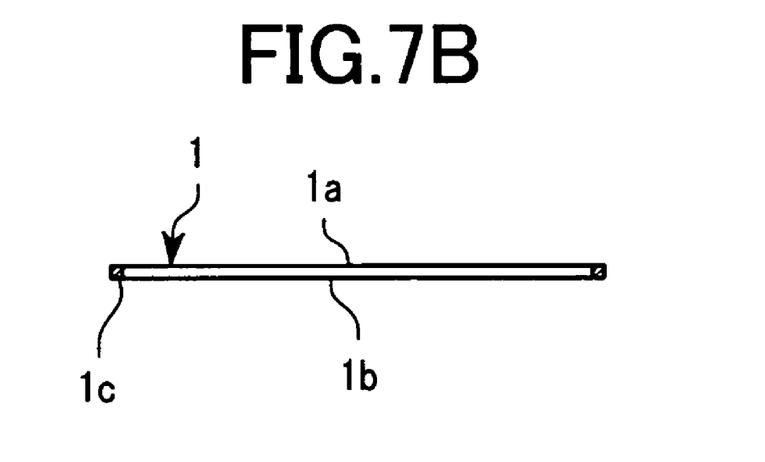
FIG. 7B is a cross sectional view along a line A-A' shown in FIG. 7A.
Figure 8A:
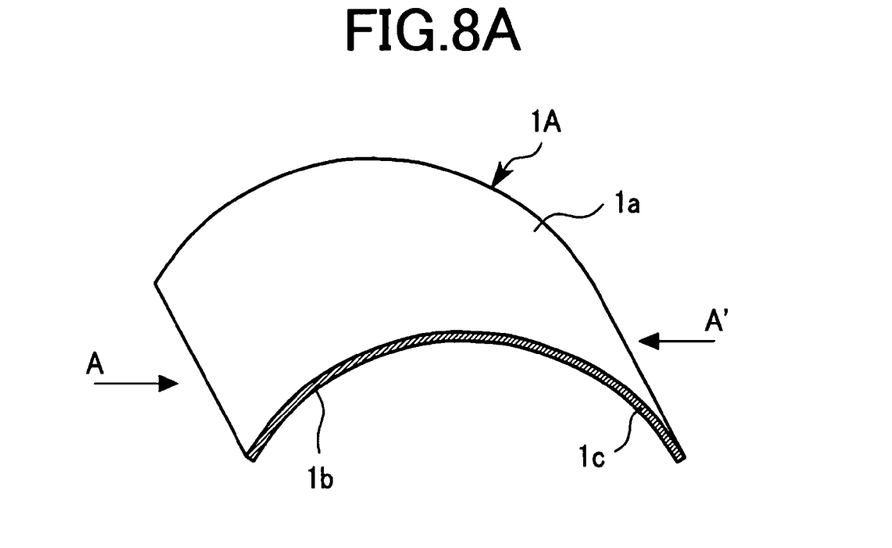
FIG. 8A is a perspective view of the liquid crystal display panel to explain a bending step subsequent to FIGS. 7A and 7B.
Figure 8B:
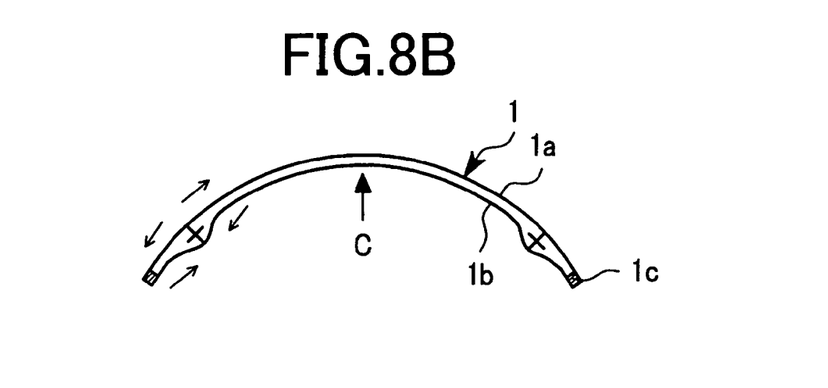
FIG. 8B is a cross sectional view along a line A-A' shown in FIG. 8A to explain the bending step subsequent to FIGS. 7A and 7B.
Figure 8C:
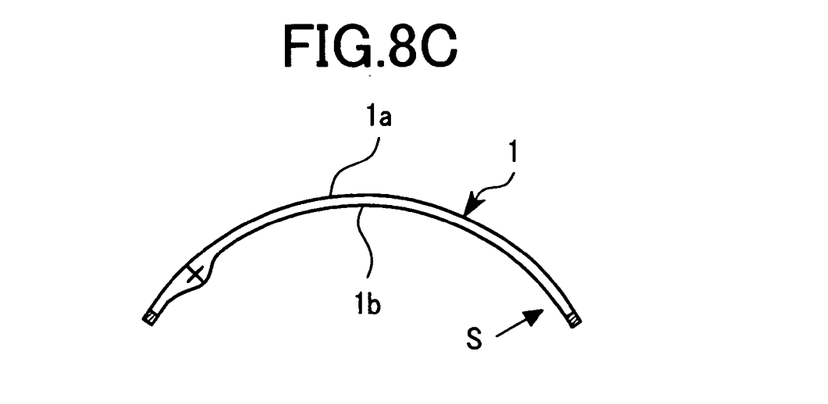
FIG. 8C is a cross sectional view along the line A-A' shown in FIG. 8A to explain the bending step subsequent to FIGS. 7A and 7B.

FIGS. 7A to 8C are diagrams explaining one example of a bending step in manufacturing of a liquid crystal display panel. FIG. 7A is a perspective view of the liquid crystal display panel and FIG. 7B is a cross sectional view along a line A-A' shown in FIG. 7A. And, FIGS. 8A to 8C are diagrams explaining a bending step subsequent to the step shown in FIGS. 7A and 7B. FIG. 8A is a perspective view of the liquid crystal display panel and FIGS. 8B and 8C are cross sectional views along a line A-A' shown in FIG. 8A.

In a case of forming the liquid crystal display panel 1 formed by sealing a liquid crystal layer between a pair of light-transmissive glass substrates 1a and 1b each having an pixel formation electrode formed on an inner surface thereof, and adhering peripheral portions of the light-transmissive glass substrates 1a and 1b by a seal member 1c as shown in FIGS. 7A to 7B, when it is formed by being bent into a curved shape as shown in FIG. 8A, the liquid crystal panel 1 has to be fixed from at least a part thereof and bent, particularly in a bending process.

In this case, the liquid crystal display panel may be damaged, depending on a position where the fixing portion starts. For example, in a case where the liquid crystal display panel 1 is bent with a center portion C thereof fixed, as shown in FIG. 8B, tensile stresses in directions indicated by arrows are caused outside a portion indicated by x which is far from the center portion C, and compressive stresses in directions indicated by arrows are caused inside the same. Accordingly, distortion is concentrated on this portion and the liquid crystal display panel 1 is damaged. Meanwhile, in a case where the liquid crystal display panel 1 is bent with one end portion S thereof fixed, as shown in FIG. 8C, distortion is concentrated on the other end portion indicated by x which is far from the one end portion S, and the liquid crystal display panel 1 is damaged.

Figure 9:
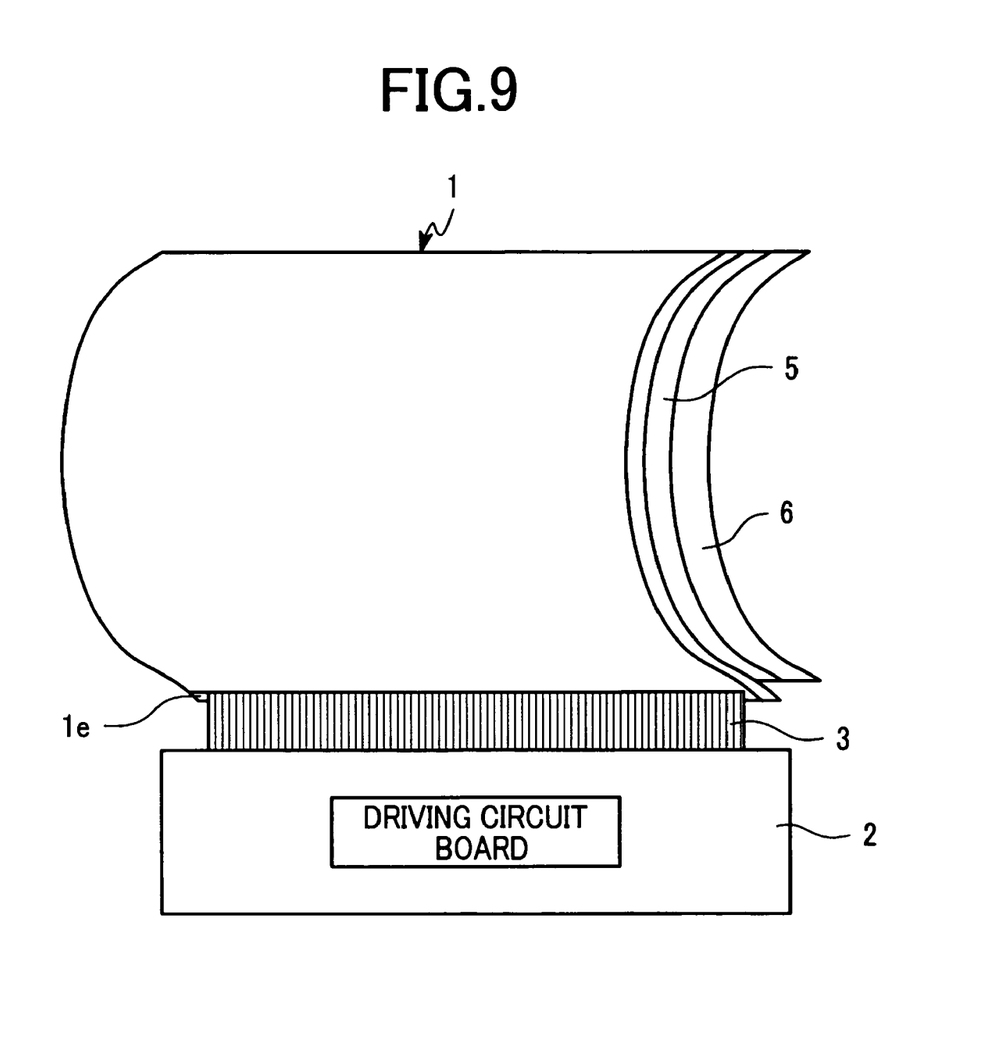
FIG. 9 is a schematic perspective view showing structure of a conventional liquid crystal display device.

And, in a case of a liquid crystal display device formed by assembling the liquid crystal display panel 1, a backlight 6 and a frame-like resin member 5 for fixing the curved shape, as shown in the schematic perspective view in FIG. 9, the liquid crystal display device may often be damaged as time passes because of a residual stress due to bending of the liquid crystal display panel 1 in one direction. Note that, a reference numeral 3 in the drawing denotes a flexible printed board electrically connecting a terminal portion 1*e* of the liquid crystal display panel 1 and an external driving circuit 2.

Accordingly, the present invention is made in order to solve the above described problems, and an object thereof is to provide a liquid crystal display device capable of curving a display surface of a liquid crystal display panel by preventing the liquid crystal display panel from being damaged due to bending of a light-transmissive substrate.

And, another object of the present invention is to provide a liquid crystal display device having a liquid crystal display panel capable of maintaining a stable curved state for a long time after being curved and finished, and capable of improving reliability thereof.

In order to achieve the above described objects, a liquid crystal display device according to the present invention comprises: a liquid crystal display panel having a liquid crystal layer sealed between a pair of light-transmissive substrates each having a pixel formation electrode formed on an inner surface thereof and having a curved shape formed by assembling positive and negative curvatures with respect to one direction; a backlight mounted on a rear surface of the liquid crystal display panel along the curved shape of the liquid crystal display panel and having at least one light emission device irradiating illumination light toward the rear surface of the liquid crystal display panel; and a resin member held in a space between peripheral portions where the liquid crystal display panel is opposed to the backlight and holding and fixing the curved shape. Because of this structure, stress difference caused by bending of the liquid crystal display panel can be canceled or eased, and the problem in the related art can be solved.

According to the present invention, since the liquid crystal display panel is formed by assembling a positive-curved surface and a negative-curved surface with respect to one direction, mechanical stress difference caused by bending of the liquid crystal display panel can be canceled or eased and the liquid crystal display panel can be prevented from being damaged. Accordingly, a superior effect that a high quality and highly reliable liquid crystal display device having a curved display surface can be realized is obtained.

In addition, according to the present invention, damage of the liquid crystal display panel at a bending step of the liquid crystal display panel and damage of the liquid crystal display panel due to a residual stress to be a problem after the liquid crystal display panel is finished can be prevented. Accordingly, a superior effect that the reliability of the liquid crystal display device having a curved display surface can be improved is obtained.

DETAILED DESCRIPTION OF THE INVENTION

In the following, preferable embodiments of the present invention will be described with reference to the drawings of the embodiments.

Embodiment 1

Figure 1:
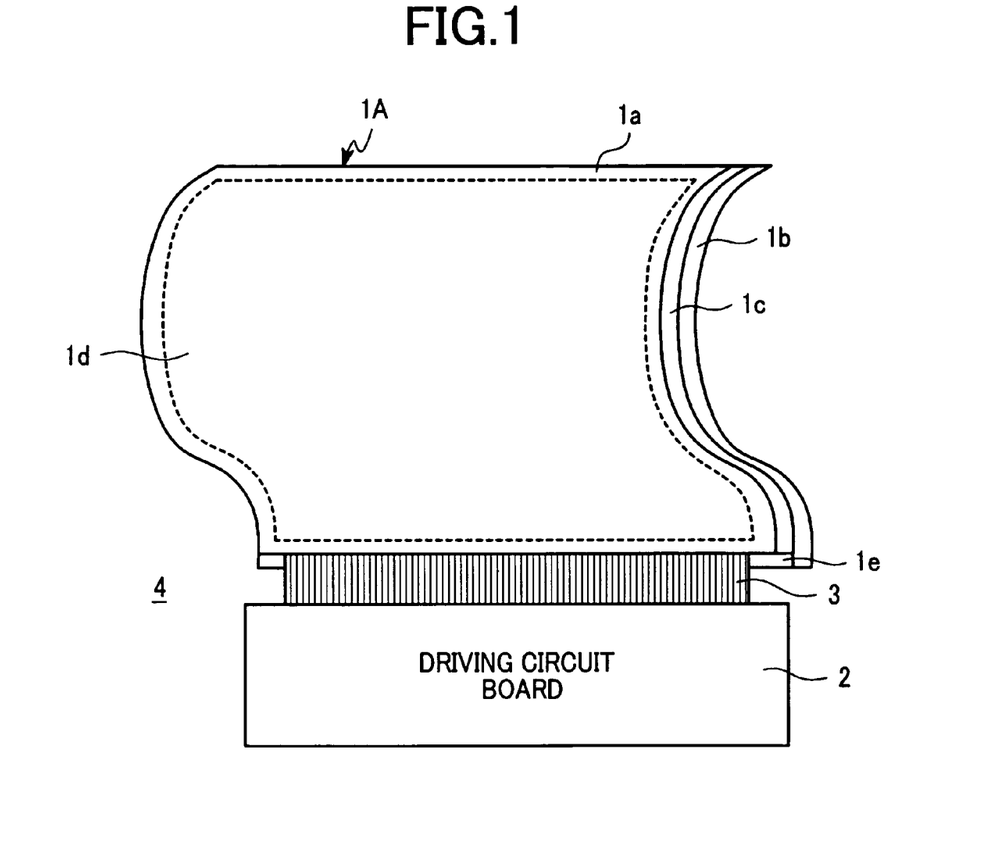
FIG. 1 is a schematic perspective view of a liquid crystal display module to explain structure of a liquid crystal display device according to an embodiment 1 of the present invention.

FIG. 1 is a schematic diagram showing structure of a liquid crystal display module to explain a liquid crystal display device according to one embodiment of the present invention. In FIG. 1, a liquid crystal display panel 1A is formed by sealing a liquid crystal layer in a space between a pair of light transmissive glass substrates 1*a*, 1*b* each having a pixel selection electrode formed on an inner surface thereof and sealing opposed peripheral portions thereof using a sealing member 1*c*. And, structure is provided, in which orientation of the liquid crystal is changed according to an electric field applied to the liquid crystal from the pixel selection electrode, source light irradiated from a backlight mounted on a rear surface side of the liquid crystal display panel 1A is polarized by about 90 degrees in the liquid crystal layer and then passed through a polarizer, and therefore, a latent electron image can be seen as a visible image on a display surface 1*d*.

And, in the liquid crystal display panel 1A, each of the pair of light-transmissive glass substrates 1*a* and 1*b* holding the liquid crystal layer is formed to have a thickness of about 0.2 mm or thinner, preferably about 0.05 mm. And, this pair of thinned light-transmissive glass substrates 1a, 1b may be formed in thinned shape by melting a thick glass plate using fluoric acid or mechanically polishing the same. Alternatively, a glass plate formed thin in advance may be used.

Figure 2A:
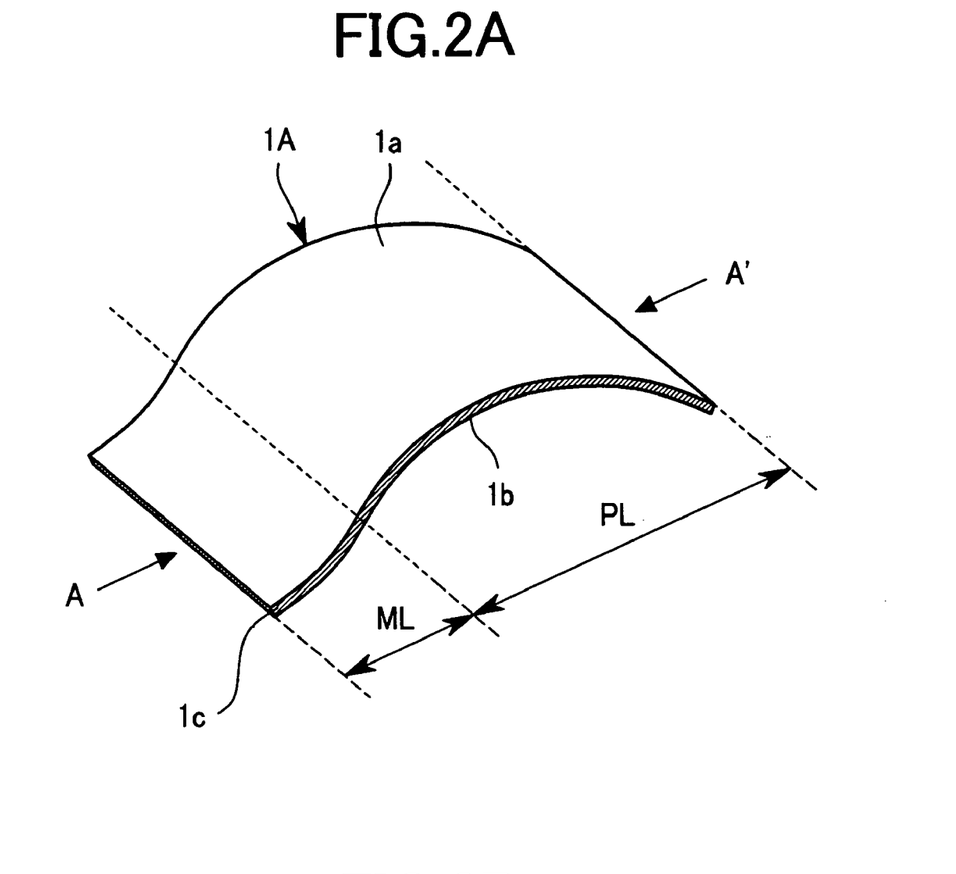
FIG. 2A is a perspective view showing structure of a liquid crystal display panel of the liquid crystal display device according to the present invention.
Figure 2B:
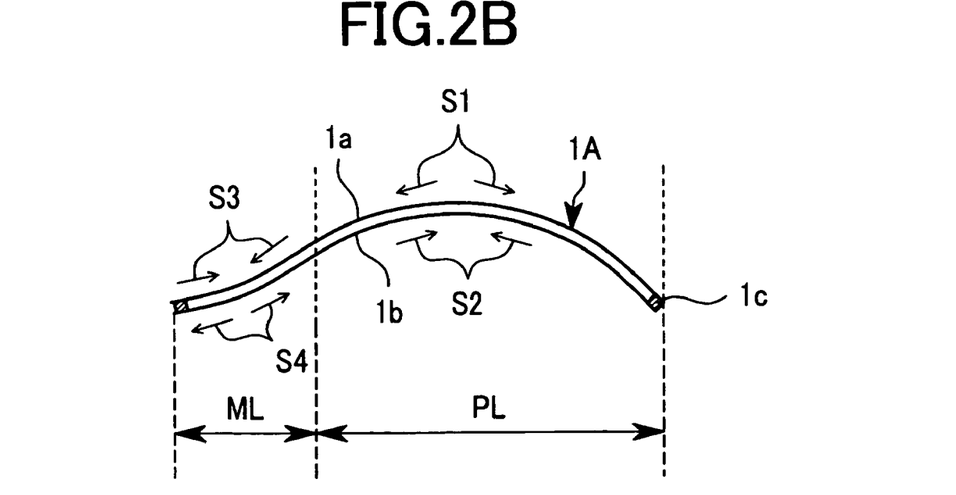
FIG. 2B is a cross sectional view along a line A-A' shown in FIG. 2A.

And, this liquid crystal display panel 1A is, as shown in the perspective view in FIG. 2A and the cross sectional view in FIG. 2B along the line A-A' shown in FIG. 2A, formed to have freely-bendable flexibility by integrally assembling a positive (convex) curved portion PL and a negative (concave) curved portion ML with respect to one direction. That is, the liquid crystal display panel 1A is formed to have opposite glass curved directions (curvatures) between an end area of the liquid crystal display panel 1A and other area thereof (an area in the vicinity of the panel).

And, in the liquid crystal display panel 1A, a driving circuit chip (not shown) driving the liquid crystal layer is mounted on one end portion of one light-transmissive glass substrate, and an electrode terminal portion 1e is formed on an end portion thereof. A flexible print board 3 electrically connected to an external driving circuit 2 is connected to the electrode terminal portion 1e so that the liquid crystal display module 4 is formed.

Note that, on a front surface side of the liquid crystal display module 4, although not shown in the diagram, a light-transmissive acrylic plate protecting a display surface of the liquid crystal display panel 1A is adhered in the external peripheral portion of the liquid crystal display panel using a frame-like sealing double-stick tape attached on a rear surface of the acrylic plate.

Figure 3:
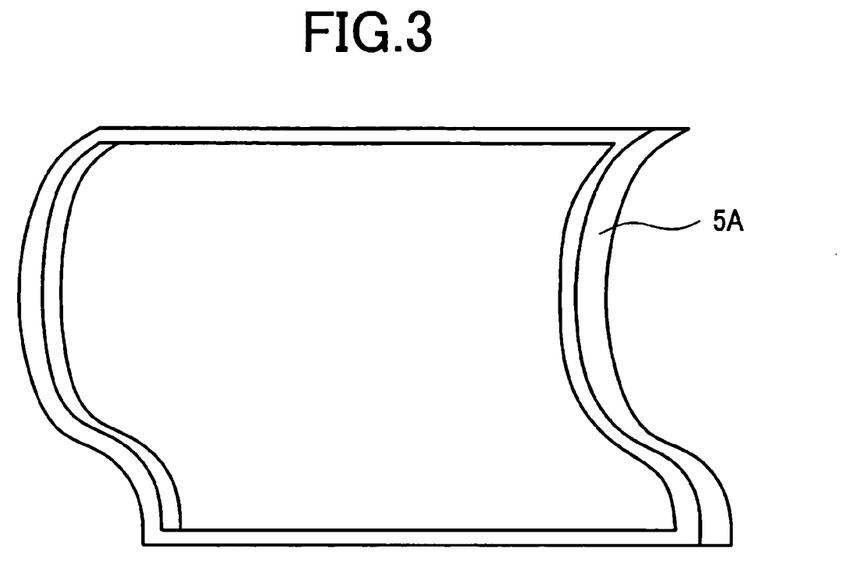
FIG. 3 is a schematic perspective view showing structure of a resin member in the liquid crystal display device according to the present invention.

And, on a rear surface side of the liquid crystal display module 4, a frame-like resin member 5A made of a molded resin having a curvature substantially identical to that of the liquid crystal display panel 1, as shown in the major element perspective view shown in FIG. 3, is attached using an adhesive member (not shown), so that the liquid crystal display panel 1A in a curved state is fixed and held in a curved shape thereof.

Figure 4:
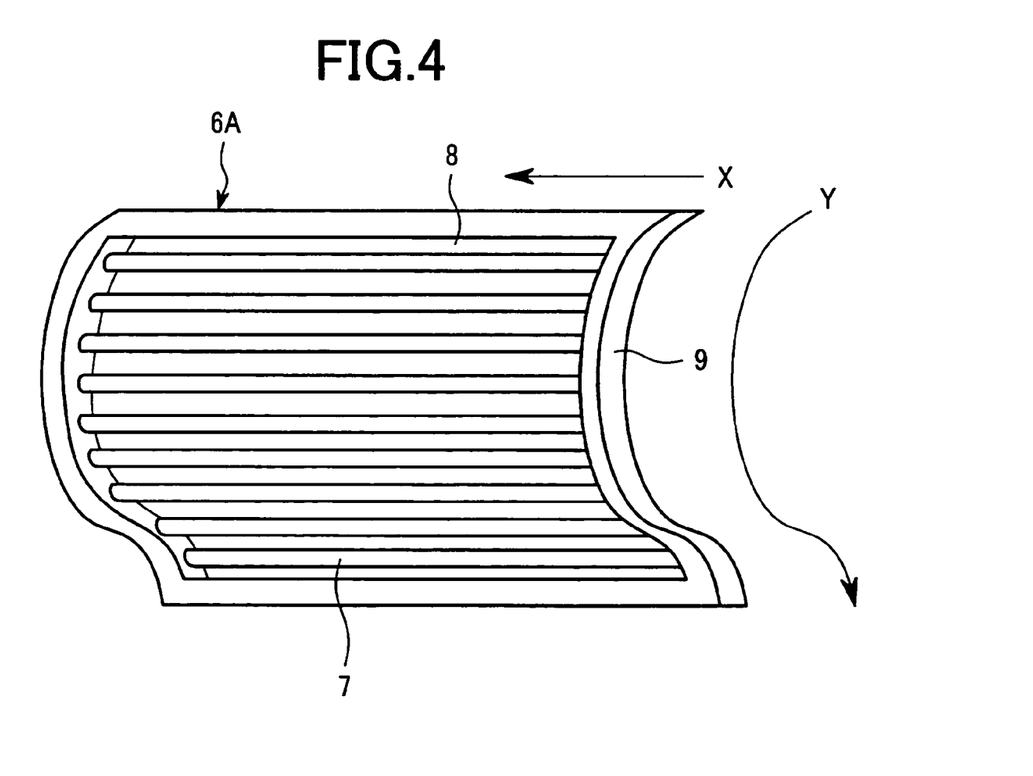
FIG. 4 is a schematic perspective view showing structure of a suspend light type backlight of the liquid crystal display device according to the present invention.

Further, on a rear surface side of the frame-like resin member 5A, a suspend light type backlight 6A irradiating illumination light toward the rear surface of the liquid crystal display panel 1A as shown in the schematic perspective view of FIG. 4 is mounted. This suspend light type backlight 6A is formed so that a front surface side thereof has a curvature substantially identical to that of the liquid crystal display panel 1A, and mounted as adhered on the rear surface side of the resin member 5A using an adhesive member (not shown).

And, although not shown in the diagram, the suspend light type backlight 6A has structure in which an optical compensation sheet stack, an optical diffusing sheet, a plurality of fluorescent lamps 7 and a reflection sheet 8 are sequentially stacked sequentially from the rear surface side of the liquid crystal module 4 and integrally mounted on a mold frame 9.

And, since the optical compensation sheet stack, the optical diffusing sheet, the reflection sheet 8 and the like are formed in thin film shapes, they are adjusted to have curvatures substantially identical to that of the liquid crystal display panel 1. On the other hand, the plurality of cooling cathode fluorescent lamps 7 are arranged and formed along a curvature direction Y (curved surface) of the liquid crystal display panel 1 to be opposed to a curved surface of the liquid crystal display panel 1 so that the plurality of cooling cathode fluorescent lamps 7 are substantially parallel with each other, in the mold frame 9.

Figure 5:
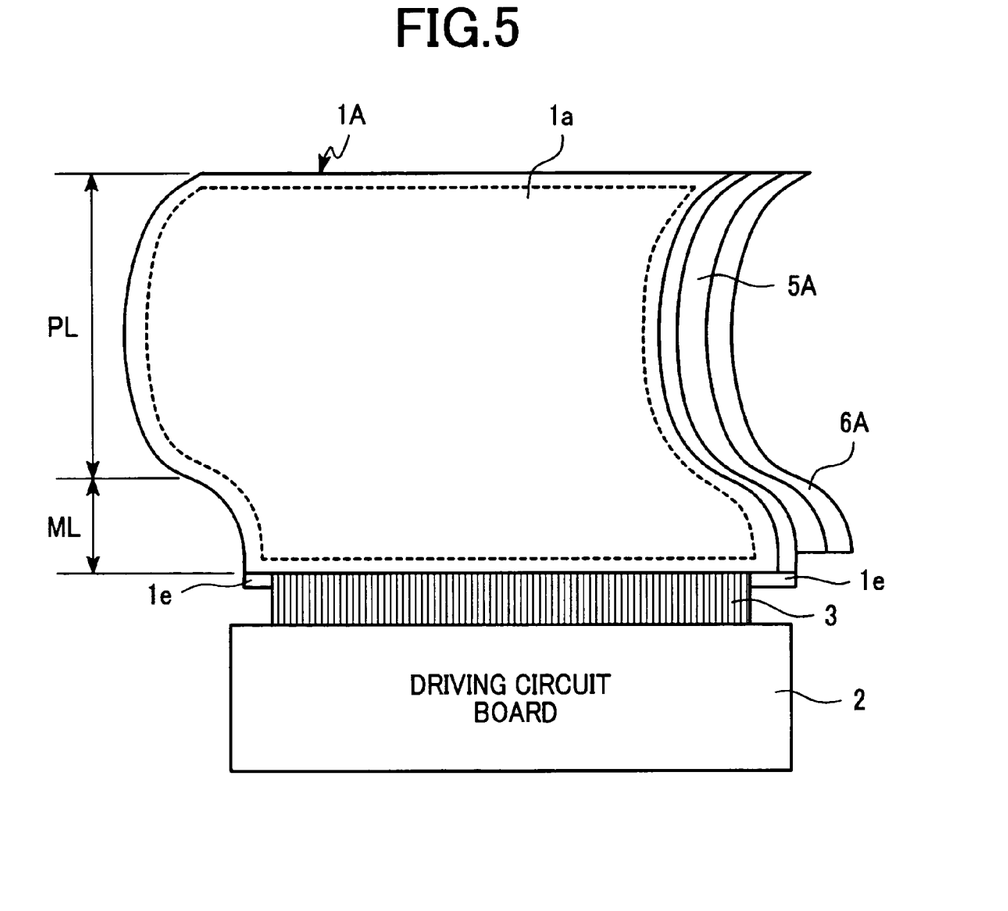
FIG. 5 is a schematic perspective view showing entire structure of the liquid crystal display device according to one embodiment of the present invention.

Then, the liquid crystal display panel 1A having a curved surface including combination of positive and negative curvatures shown in FIG. 1, the resin member 5A having an identical curved surface shown in FIG. 3 and the suspend light type backlight 6A having an identical curved surface shown in FIG. 4 are integrally assembled so that the respective curved surfaces are matched, as shown in the schematic perspective view of FIG. 5, and as a result, the liquid crystal display device is formed.

The liquid crystal display device formed as described above includes the liquid crystal display panel 1A having a rectangular-shaped display surface. And in the liquid crystal display panel 1A, the display surface is curved by forming a glass surface of each of the pair of light-transmissive glass substrates 1a, 1b by integrally assembling a positive (convex) curved portion PL and a negative (concave) curved portion ML with respect to one direction, as shown in FIG. 2B. With this arrangement, tensile stresses in directions indicated by arrows S1 are caused outside the positive curved portion PL and compressive stresses in directions indicated by arrows S2 are caused inside the same. In addition, compressive stresses in directions indicated by arrows S3 are caused outside the negative curved portion ML and tensile stresses in directions indicated by arrows S4 are caused inside the same. Accordingly, the respective two glass substrates no longer receive a compressive or tensile stress in a one-sided manner, and distortion between the two glass substrates due to difference in directions of stresses between the respective glass substrates is cancelled or eased. As a result, breakage hardly occurs.

Embodiment 2

Figure 6A:
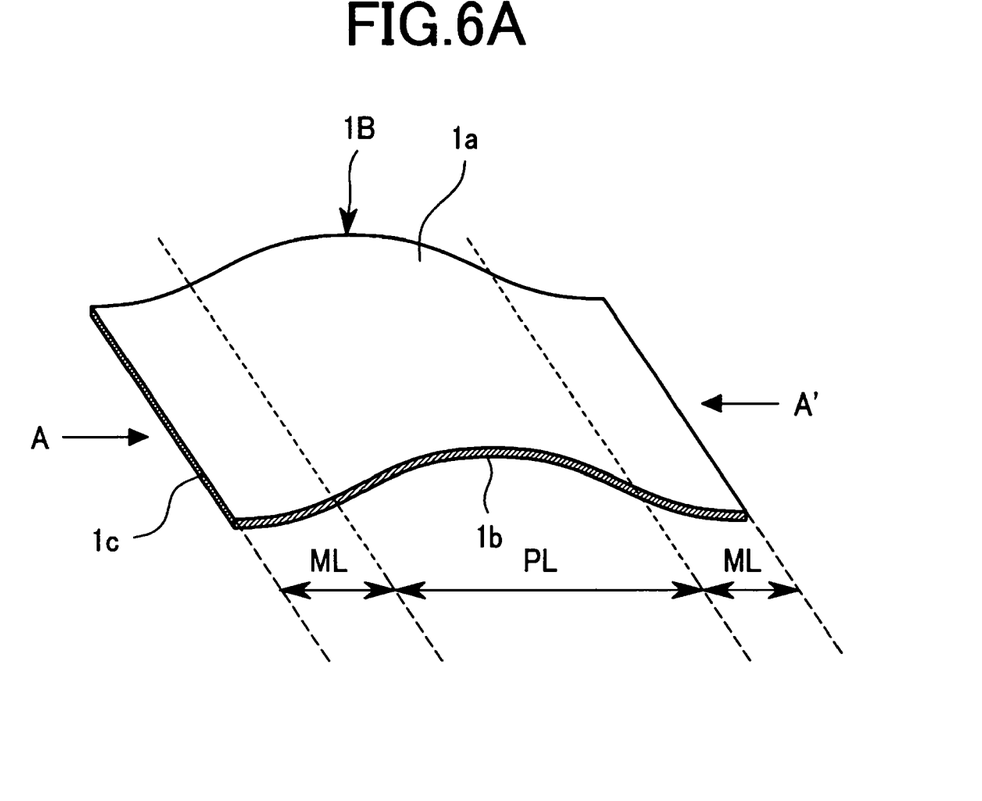
FIG. 6A is a perspective view showing structure of a liquid crystal display panel according to another embodiment.
Figure 6B:
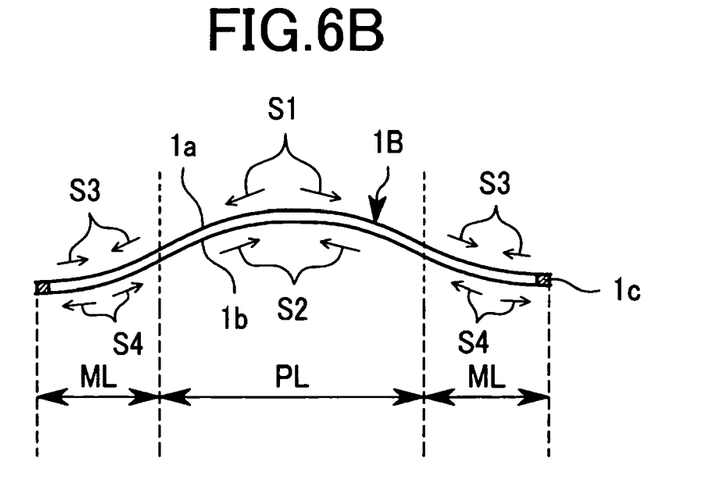
FIG. 6B is a cross sectional view along a line A-A' shown in FIG. 6A.

FIGS. 6A and 6b are diagrams showing a liquid crystal display panel to explain structure of a liquid crystal display device according to one embodiment of the present invention. FIG. 6A is a perspective view and FIG. 6B is a cross sectional view along a line A-A' shown in FIG. 6A. The liquid crystal display panel 1B shown in FIG. 6 is formed to have freely-bendable flexibility by integrally assembling a negative (concave) curved portion ML, a positive (convex) curved portion PL and another negative (concave) curved portion ML with respect to one direction. That is, the liquid crystal display panel 1 is formed to have opposite glass curved directions (curvatures) between areas in the vicinities of both end portions of the liquid crystal display panel 1 and other area thereof (an area in the vicinity of center of the panel).

And, on a rear surface side of this liquid crystal display panel 1B, although not shown in the diagram, a resin member and a suspend light type backlight having curvatures substantially identical to that of the liquid crystal display panel 1 are sequentially adhered using an adhesive member, so that the liquid crystal display device is formed.

In the structure as described above, in the vicinity of the center portion of the liquid crystal display panel 1B, tensile stresses in directions indicated by arrows S1 are caused outside a positive curved portion PL, and compressive stresses in directions indicated by arrows S2 are caused inside the same. In addition, compressive stresses in directions indicated by arrows S4 are caused outside the respective negative curved portions ML of the liquid crystal display panel 1B, and tensile stresses in directions indicated by arrows S4 are caused inside the same. Accordingly, the two respective glass substrates no longer receive a compressive or tensile stress in one-sided manner, and distortion between the two glass substrates due to difference in directions of stresses between the respective glass substrates is cancelled or eased. As a result, breakage hardly occurs.

Note that, although the case in which the present invention is applied to a liquid crystal display as a curved display is described in the above described embodiment, the present invention is not limited to this application, and it is needless to say that, an equivalent effect can be obtained in a case where the present invention is applied to an organic EL display panel, and the organic EL display panel is formed by assembling negative and positive curvatures.

And, the present invention is not limited to a liquid crystal display and an organic EL display, and it is needless to say that, the present invention can be applied to any structure in which two or more glass layers are attached to one another and then bent to form a curved display.

And, although the case of forming a liquid crystal display panel into a rectangular shape is described in the above described embodiment, it is needless to say that the present invention is not limited to this application, and that the present invention can be applied to cases of liquid crystal display panels having a polygon shape having three or more sides and even having a circular shape.

And, although the case in which a cooling cathode fluorescent lamp is used as the fluorescent lamp is described in the above described embodiment, it is needless to say that the present invention is not limited to this application, and that the present invention can be applied to a case in which an external electrode fluorescent lamp is used.

And, although the case in which the suspend light type backlight using the fluorescent lamp is used as the backlight is described in the above described embodiment, it is needless to say that the present invention is not limited to this application, and that the present invention can be applied to a case in which a lateral light type backlight is used instead of the suspend light type backlight and a case in which another light emission device such as a light emission diode is used instead of the fluorescent lamp.

And, although a case in which a glass member is used as material of the liquid crystal display panel is described in the above described embodiment, the present invention is not limited to this application, and can be applied to cases in which an organic member such as a ceramic member, a high polymer resin member, a heat resistive plastic member and the like are used instead of the glass member. And, a substantially equivalent effect can be obtained in a point of easing a stress caused by bending.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a liquid crystal display panel having liquid crystal layer sealed between a pair of light-transmissive substrates and having a curved shape formed by assembling a positive curvature and a negative curvatures with respect to one direction, along a main surface of the liquid crystal panel,
   wherein the curved shape has a first curved portion and a second curved portion,
   the main surface has a center portion and an end portion, each facing a same direction as the main surface and arranged in the one direction,
   the end portion includes one of two opposite sides of the main surface, the two sides facing each other and aligned in the one direction,
   the first curved portion includes the center portion,
   the second curved portion includes the end portion,
   the first curved portion has a length longer than a length of the second curved portion and the first curved portion has a surface area which is greater than half of a total surface area of the liquid crystal display panel,
   one of the first curved portion and the second curved portion has a positive curvature, and
   the other of the first curved portion and the second curved portion has a negative curvature.

2. The liquid crystal display device according to claim 1, further comprising:
   a backlight mounted on a rear surface of the liquid crystal display panel along the curved shape of the liquid crystal display panel and having at least one light emission device irradiating illumination light toward the rear surface of the liquid crystal display panel; and
   a resin member held in a space between peripheral portions where the liquid crystal display panel is opposed to the backlight and holding and fixing the curved shape.

3. The liquid crystal display device according to claim 1, wherein the light-transmissive substrates are glass substrates.

4. The liquid crystal display device according to claim 3, wherein each of the glass substrate has a panel thickness equal to or smaller than 0.2 mm.

5. The liquid crystal display device according to claim 2, wherein the light emission device is a fluorescent lamp, and wherein a plurality of fluorescent lamps are arranged and formed along a curvature direction of the liquid crystal display panel to be opposed to the curved surface of the liquid crystal display panel.

6. The liquid crystal display device according to claim 5, wherein the fluorescent lamp is one of a cooling cathode fluorescent lamp and an external electrode fluorescent lamp.

7. The liquid crystal display device according to claim 1, wherein the first curved portion includes another end portion which includes the other one of the two sides.

8. A liquid crystal display device, comprising:
   a liquid crystal display panel having liquid crystal layer sealed between a pair of light-transmissive substrates and having a curved shape formed by assembling positive and negative curvatures with respect to one direction,
   wherein the curved shape has a first curved portion and a second curved portion,
   a main surface of the liquid crystal display panel has a center portion and an end portion, each facing a same direction as the main surface and arranged in the one direction,
   the end portion includes one of two opposite sides of the main surface, the two sides facing each other and aligned in the one direction,
   the center portion includes the first curved portion, but not the second curved portion,
   the end portion includes the second curved portion, but not the first curved portion,
   the first curved portion has a length longer than a length of the second curved portion and the first curved portion has a surface area which is greater than half of a total surface area of the liquid crystal display panel,
   one of the first curved portion and the second curved portion has a positive curvature, and
   the other of the first curved portion and the second curved portion has a negative curvature.

* * * * *